No. 854,408. PATENTED MAY 21, 1907.
B. D. DRUEN.
MOTOR VEHICLE.
APPLICATION FILED JULY 9, 1906.

3 SHEETS—SHEET 1.

Witnesses:
J. K. Shumway
C. L. Weed

Bernard D. Druen
Inventor
By attys Seymour & Earle

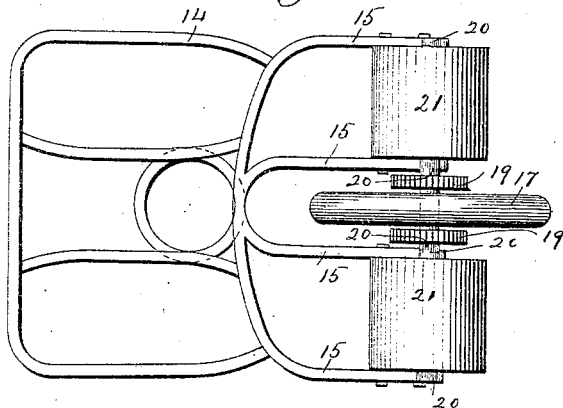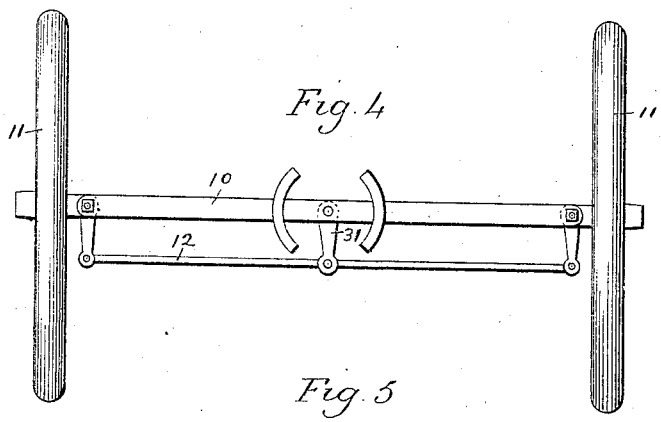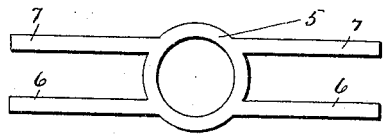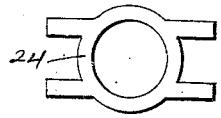

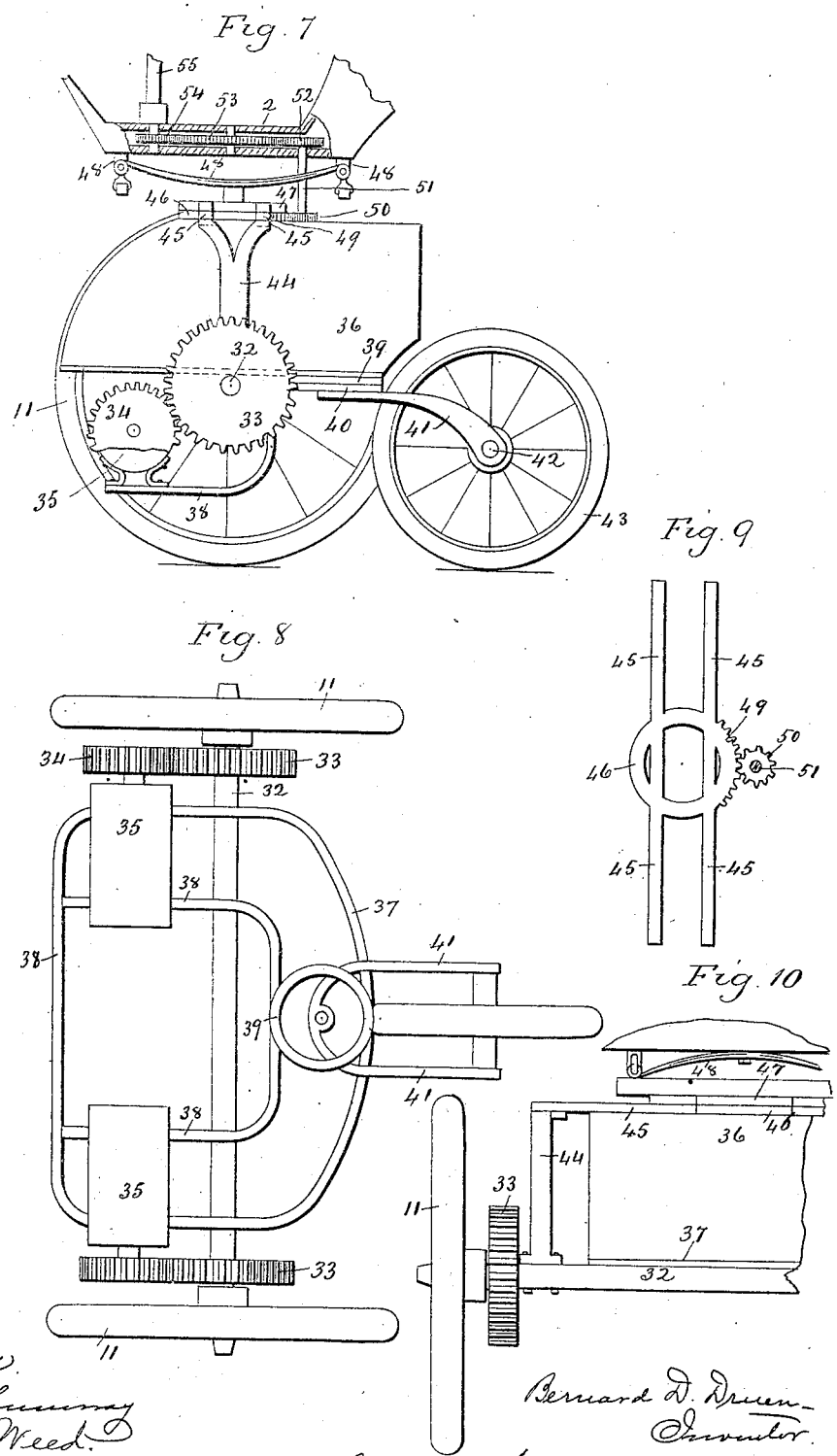

UNITED STATES PATENT OFFICE.

BERNARD D. DRUEN, OF NEW HAVEN, CONNECTICUT.

MOTOR-VEHICLE.

No. 854,408.　　　Specification of Letters Patent.　　　Patented May 21, 1907.

Application filed July 9, 1906. Serial No. 325,251.

*To all whom it may concern:*

Be it known that I, BERNARD D. DRUEN, a citizen of the United States, residing at New Haven, in the county of New Haven and State of Connecticut, have invented a new and useful Improvement in Motor-Vehicles; and I do hereby declare the following, when taken in connection with the accompanying drawings and the letters of reference marked thereon, to be a full, clear, and exact description of the same, and which said drawings constitute part of this specification, and represent, in—

Figure 1:
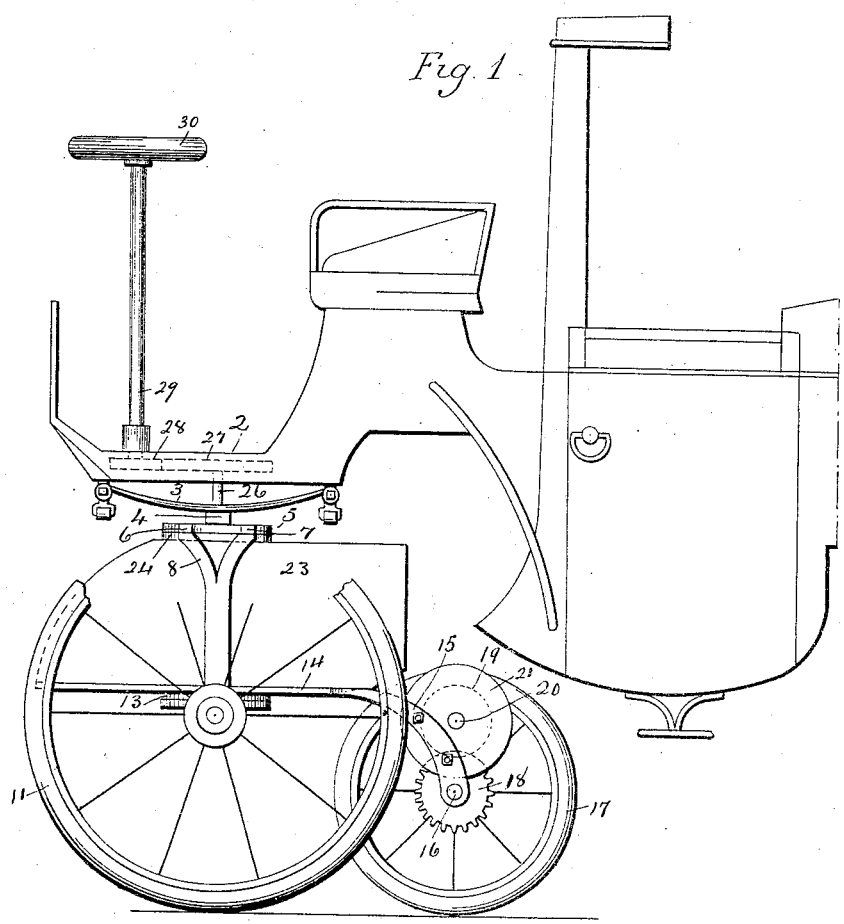
Figure 2:
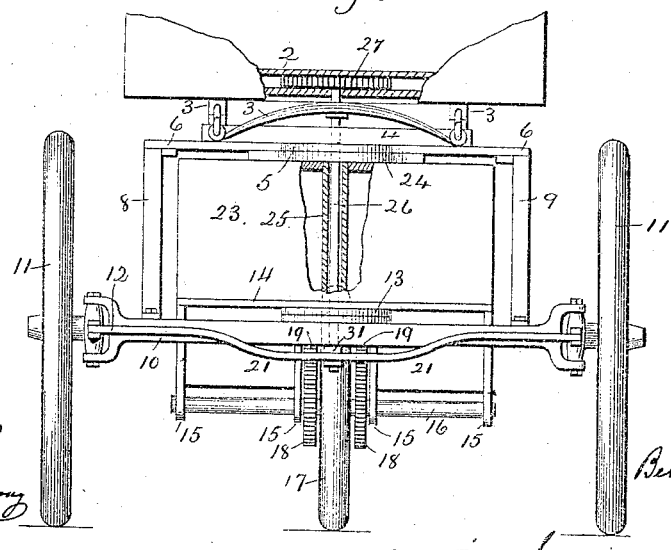

Figure 1 a broken side wiew of the forward portion of a motor vehicle constructed in accordance with my invention. Fig. 2 a broken front view of the driving mechanism. Fig. 3 a top or plan view of the platform with the battery box removed therefrom. Fig. 4 a top or plan view of the forward axle illustrating means for turning the wheels thereon. Fig. 5 a plan view of the upper member of the fifth wheel construction between the motor and boot. Fig. 6 a plan view of the lower member of the fifth wheel for the same place. Fig. 7 a side view partially in section showing the motive power as applied directly to the forward wheel. Fig. 8 a top or plan view of the forward axle and motor platform with the battery box removed. Fig. 9 a top or plan view of the lower member of the fifth wheel construction between the top of the motor and the boot. Fig. 10 a front view of a portion of the motor parts showing one of the forward wheels, and means for supporting the vehicle from the forward axle.

This invention relates to an improvement in motor vehicles, and while adapted for motor vehicles of various styles is particularly applicable for landaus, broughams, &c., the object being to so arrange the motive power that it will be mainly supported upon the front axle and independent of the body and not necessitate a change in the construction of the body of the vehicle so that the device may be placed under old or new carriages, does not strain the body and preserves the graceful lines and easy riding qualities of the present style of carriages.

In illustrating my invention, I have indicated a landaulet body the boot 2 of which rests upon the usual platform springs 3 which are supported by a transverse bar 4 which rests upon the top of the upper member 5 of a fifth wheel, the side bars 6 and 7 of which extend outward on opposite sides and are supported by upright braces 8 and 9 which are clipped upon the axle 10 so as to be stationary thereon. The front wheels 11 are pivotally connected with the axle in the usual way of connecting the steering wheels of motor vehicles, and the hubs are connected by a link 12 by which the wheels may be turned as will hereafter appear.

Resting upon the axle and free to turn thereon with the usual arrangement of fifth wheel 13 is a platform 14 having rearwardly and downwardly extending arms 15 supporting an axle 16 on which a driving wheel 17 is mounted. On opposite sides of the wheel 17 and keyed to the axle are gear wheels 18 which mesh with gears 19 mounted on the driving shaft 20 of motors 21 which are supported by the arms 15 projecting rearward from the platform 14 and mounted upon the platform is a battery box 23 the battery and motor being of usual construction and not requiring further description.

While for convenience I have shown and described a battery box, it will be understood that any power may be utilized for turning the driving wheel.

To the top of the battery box, the lower member 24 of a fifth wheel is connected for coaction with the upper member 5. Extending through the battery box 23 is a tube 25 through which a rod 26 extends, this rod passing up into the boot 2 where it is keyed to a pinion 27 which meshes with a pinion 28 at the lower ends of a steering shaft 29 the operating handle 30 of which is located at a convenient point. At the lower end the rod 26 passes through the axle 10 beneath which it is provided with a forwardly extending arm 31 which engages with the link 12 which, as shown in Fig. 2 of the drawings, is bowed downward to give clearance. Thus by turning the handle 30 the front wheels 11 may be turned to steer the vehicle in the usual way. It will thus be seen that the weight of the motive power is borne upon the forward wheels and the driving wheel and does not interfere with the usual vehicle body.

Instead of applying the motive power to the wheel 17 the motive power may be applied directly to the front wheels 11. Thus, as shown in Figs. 7 and 8 of the drawings, the wheels 11 are fixed to a solid axle 32 and secured to the hubs of the wheels are gears 33 which mesh with pinions 34 of motors 35 which are driven from power inclosed in a casing 36 mounted upon a platform 37 secured to the axle 32, the platform having downwardly bowed arms 38 which support the motors 35. This platform includes the upper member 39 of a fifth wheel, the lower member 40 of which is connected with arms 41 which extend to the axle 42 of a supporting wheel 43 which is free to turn to follow the turning of the forward wheels 11. Clipped to the axle are upright braces 44 connected with arms 45 of the lower member of a fifth wheel 46 which is secured to the top of the box 36, the upper member 47 of the fifth wheel supporting the platform springs 48 in the same way as were the springs supported in the previous construction. In this arrangement of parts it is necessary to turn the axle 32 in order to turn the forward wheels 11, and for this purpose I provide the lower member 46 of the fifth wheel on one side with teeth 49, and meshing with them is a pinion 50 at the lower end of a shaft 51 which extends up into the boot 2.

Upon the upper end of the shaft and in the boot is a pinion 52 meshing with a pinion 53 which is turned by a pinion 54 fixed to the lower end of a steering shaft 55 and so that by turning said shaft, the fifth wheel 46 will be turned, and the movement of this wheel turns the axle 32, the supporting wheel 43 being allowed to follow in whichever way the forward wheels are turned, this latter construction permitting the motor to be used in connection with vehicles of ordinary construction as in either case my improved driving mechanism can be made independently of the body and applied to bodies already in use.

I claim:—

1. In a motor vehicle, the combination with the body and boot thereof, of platform springs below said boot and connected therewith, a fifth wheel on which said springs rest and to which they are connected, the lower member having outwardly extending arms, a front axle and wheels thereon, vertical braces secured to said axle near said wheels and connected with the arms of the fifth wheel to support the same, a motor arranged between said axle and fifth wheel, and connections from said motor for driving said wheel.

2. In a motor vehicle, the combination with a body comprising a boot, front axle and wheels therefor, said body being supported at a point above said axle, a platform bearing on said axle, a motor on said platform, said platform having rearwardly extending arms, a driving wheel mounted at the ends thereof, and means connected with said motors for driving said wheel.

3. A motor vehicle comprising a boot, platform springs beneath the same, a front axle and braces extending upward therefrom to support said springs, a platform arranged on said axle, a motor resting thereon, said platform having rearwardly extending arms, a driving wheel mounted at the ends thereof, and connections between the motor and the driving wheel for imparting movement thereto, substantially as described.

4. A motor vehicle comprising a boot and platform springs beneath the same, a front axle, arms extending upward therefrom to support said springs, fifth wheels pivotally connected with said axle, a platform mounted on said axle and having fifth wheel connection therewith, said platform having rearwardly extending arms, a wheel mounted in the outer ends thereof, a motor mounted on said platform, and means for imparting motion to the said forward wheels, a link connecting said forward wheel, a steering rod passing downward through said motor and connected at its lower end with said link, and means above said standard for turning said rod, substantially as described.

In testimony whereof, I have signed this specification in the presence of two subscribing witnesses.

BERNARD D. DRUEN.

Witnesses:
  FREDERIC C. EARLE,
  CLARA L. WEED.